L. W. FRANE.
POWER TRANSMISSION ATTACHMENT FOR MOTOR VEHICLES.
APPLICATION FILED DEC. 8, 1917.
1,277,897.
Patented Sept. 3, 1918.
2 SHEETS—SHEET 2.
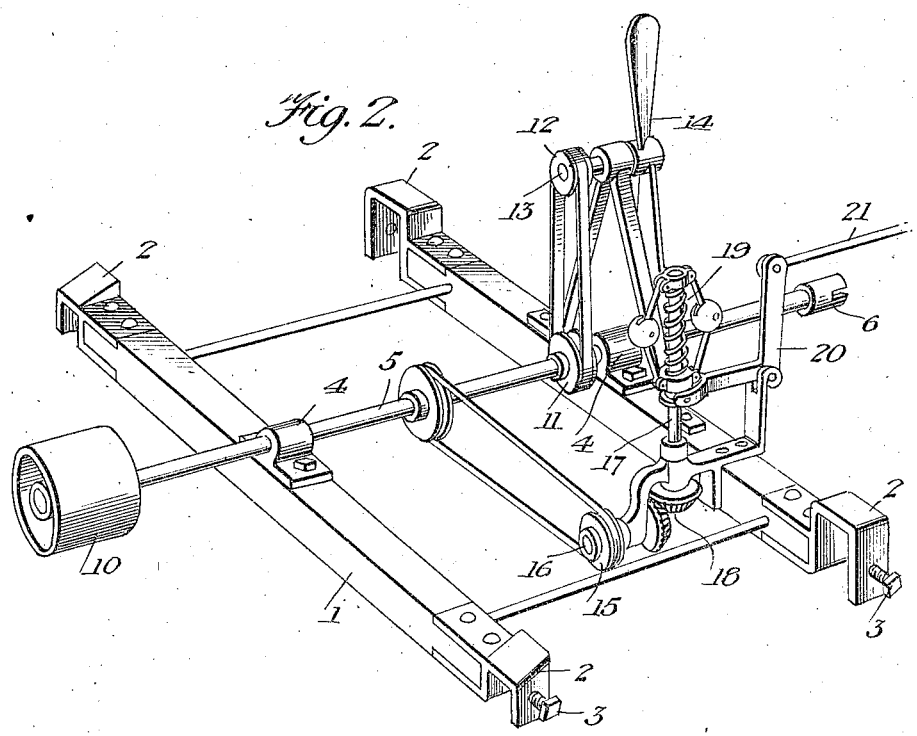
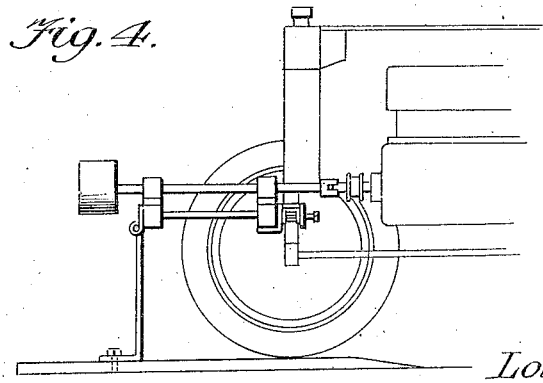
Inventor
Louis W. Frane
Witnesses
By Victor J. Evans
Attorney

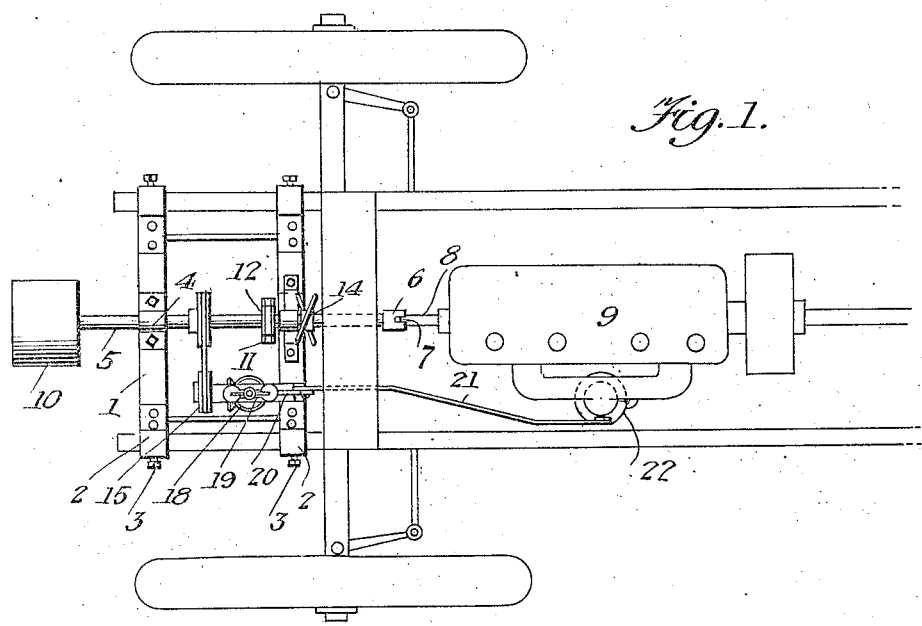
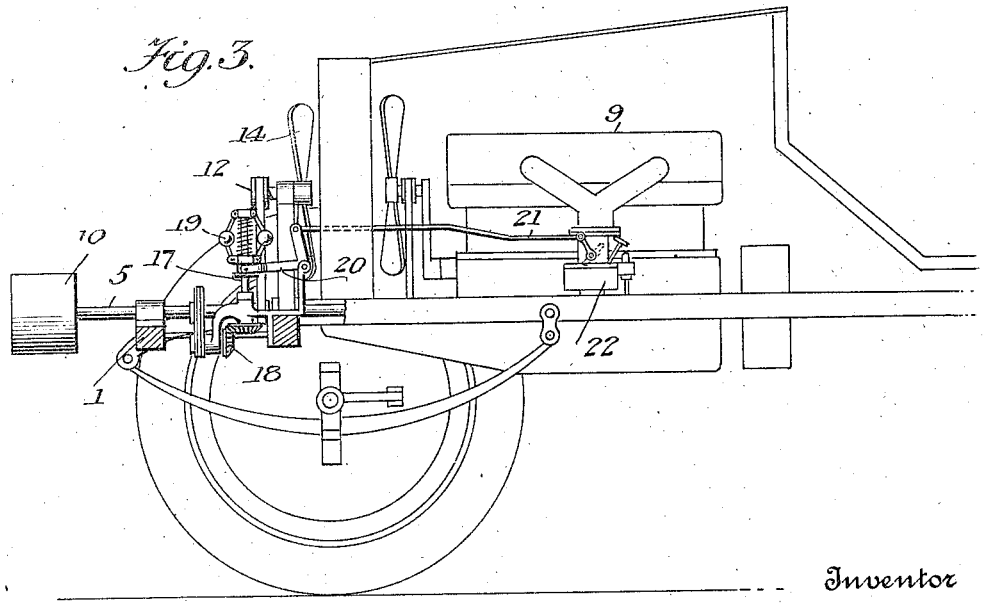

UNITED STATES PATENT OFFICE.

LOUIS W. FRANE, OF COLBY, WISCONSIN.

POWER-TRANSMISSION ATTACHMENT FOR MOTOR-VEHICLES.

1,277,897.　　　　　Specification of Letters Patent.　　Patented Sept. 3, 1918.

Application filed December 8, 1917. Serial No. 206,267.

*To all whom it may concern:*

Be it known that I, LOUIS W. FRANE, a citizen of the United States, residing at Colby, in the county of Clark and State of Wisconsin, have invented new and useful Improvements in Power-Transmission Attachments for Motor-Vehicles, of which the following is a specification.

This invention relates to power transmission attachments for motor vehicles, the object of the invention being to produce a power transmission unit adapted to be easily and quickly attached to and disconnected from the front of a motor vehicle, the attachment enabling the power of the engine of the motor vehicle to be utilized for all ordinary farm power purposes. The improved attachment is designed to take the place of the ordinary farm stationary engine now in common use and will be found more effective and reliable than such stationary engine for the reason that it will give a steadier pull when load is imposed thereon due to the number of cylinders of the motor vehicle engine as compared with the stationary engine which usually has but a single cylinder.

With the above and other objects in view, the invention consists in the novel construction, combination and arrangement of parts, herein fully described, illustrated and claimed.

In the accompanying drawings:—

Figure 1 is a plan view partly in section showing the power transmission attachment in its applied relation thereto.

Fig. 2 is a perspective view of the power transmission attachment detached.

Fig. 3 is a side elevation, partly in section, of the structure shown in Fig. 1.

Fig. 4 is a side elevation of the same on a reduced scale.

The power transmission attachment contemplated in this invention is constructed as a unit applicable as a whole to the front end of a motor vehicle. To that end the attachment comprises a frame 1 supported by means of brackets 2 on the front end of a motor vehicle, the brackets being permanently connected to the frame 1 and detachably connected to the frame of the motor vehicle by fastening means 3.

The frame is provided with bearings 4 for a shaft 5 having at one end a clutch member 6 which is designed to engage a corresponding clutch member 7 on the front end of the shaft 8 of the motor vehicle engine conventionally represented at 9. The shaft 5 has fast on the end thereof farthest from the motor vehicle a belt pulley 10 from which the power is delivered to any suitable machine. The shaft 5 also has fast thereon a smaller belt pulley 11 from which a driving belt extends around another pulley 12 on the shaft 13 of a fan which is positioned directly in front of the radiator of the motor vehicle to provide an additional amount of air for cooling the radiator and engine, it being well known that an engine heats more rapidly when the vehicle is standing still. Another belt extends from the shaft 5 around a pulley 15 on a governor driving shaft 16, the shaft 16 being geared to a vertical governor shaft 17 by gears 18. 19 represents a centrifugal governor actuated by the shaft 17 and operatively connected with a bell crank lever 20 from which a rod 21 extends rearwardly to the carbureter 22 of the engine. The connection 21 operates on the throttle valve of the carbureter to automatically cut down the supply of gas when only a light load is imposed on the engine, preventing the engine from racing and thereby wasting fuel. On the other hand when a load is imposed on the engine, the connection 21 operates to open the throttle valve and furnish the additional mixture to the engine required by such load. Thus the operation of the power transmission attachment is automatic and is governed by the load imposed on the engine. The device as a whole may be easily and quickly attached to the motor vehicle and coupled to the engine shaft and the carbureter. When the motor vehicle is being used for ordinary purposes, it gives no evidence of anything additional to the ordinary equipment, no alteration of the vehicle being required in order to adapt it to be used in connection with the power transmission attachment herein described and shown.

I claim:—

A power transmission attachment for motor vehicles, comprising a frame, means for detachably fastening said frame to the frame of a motor vehicle, a shaft journaled in bearings on the frame of the attachment, means on said shaft for coupling the same to the engine shaft, a power delivering belt pulley on the shaft of the attachment, a fan journaled on the attachment frame and driven by a belt from the attachment shaft, a governor supported by the attachment frame and driven by a belt from the attachment shaft, a bell crank lever operatively connected with a moving part of said governor, and a connection between said bell crank lever and the throttle valve of the carbureter of the motor vehicle engine.

In testimony whereof I affix my signature.

LOUIS W. FRANE.